United States Patent [19]

Kassabian

[11] 4,360,328
[45] Nov. 23, 1982

[54] COTTON CANDY MANUFACTURING APPARATUS

[76] Inventor: Levon Kassabian, 1375 Riviera Dr., Pasadena, Calif. 91107

[21] Appl. No.: 273,672

[22] Filed: Jun. 15, 1981

[51] Int. Cl. .............................. A23G 3/12; B29F 3/06
[52] U.S. Cl. ....................................................... 425/9
[58] Field of Search ................ 425/9, 126 S, 135, 144, 425/155; 426/572, 660 X

[56] References Cited

U.S. PATENT DOCUMENTS

| | | | |
|---|---|---|---|
| 3,203,365 | 8/1965 | Bowe et al. | 425/9 |
| 3,856,443 | 12/1974 | Salvi | 425/9 |
| 4,293,292 | 10/1981 | Israel | 425/9 |

Primary Examiner—Willard E. Hoag
Attorney, Agent, or Firm—Wagner & Bachand

[57] ABSTRACT

Apparatus for the manufacture of cotton candy, comprising means adapted to form in situ in a dish shaped pan a generally annular mass of cotton candy circumscribed by the pan, spindle means winding a portion of the cotton candy mass on itself for separation from the balance of the mass, and spindle carrying means alternately injecting the spindle into and withdrawing the spindle from the mass of cotton candy in timed relation with the accumulation of cotton candy within the pan to recover successive separated portions the cotton candy as made in the pan.

24 Claims, 5 Drawing Figures

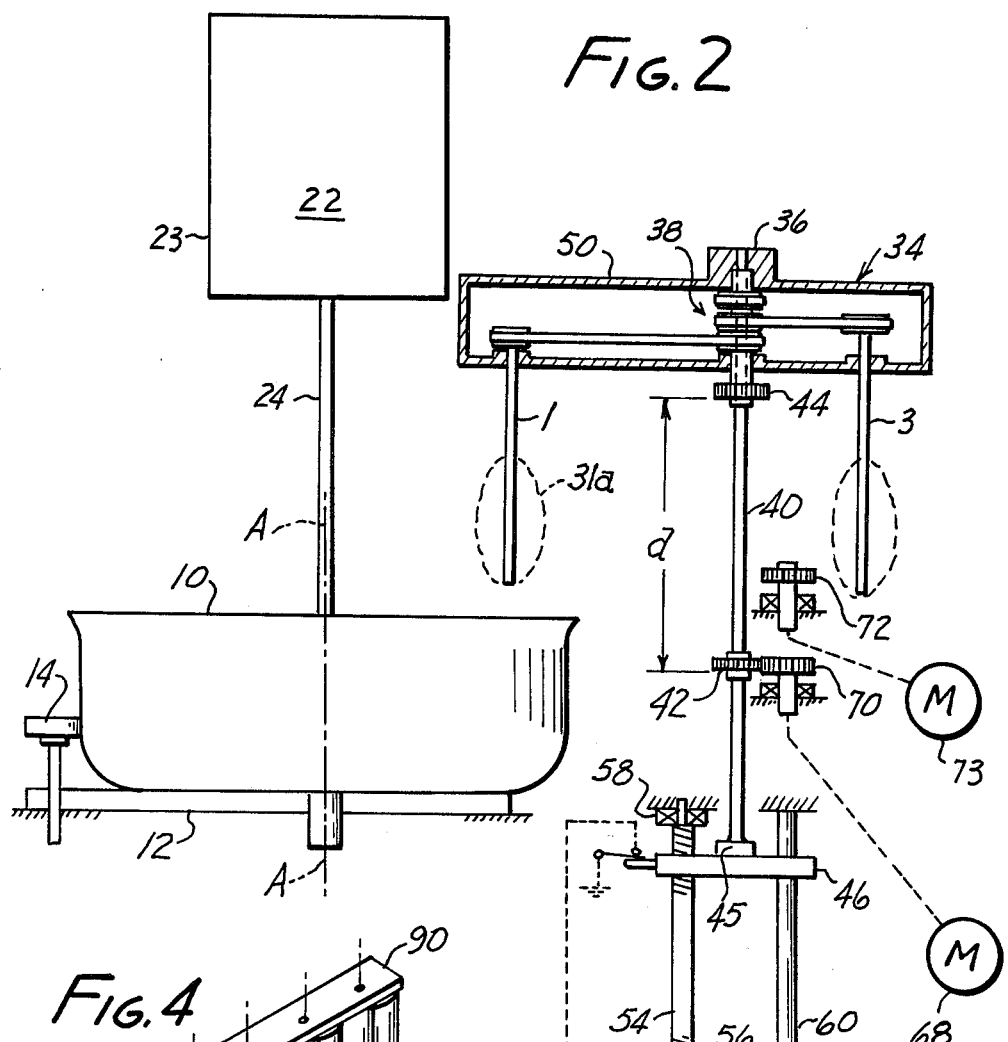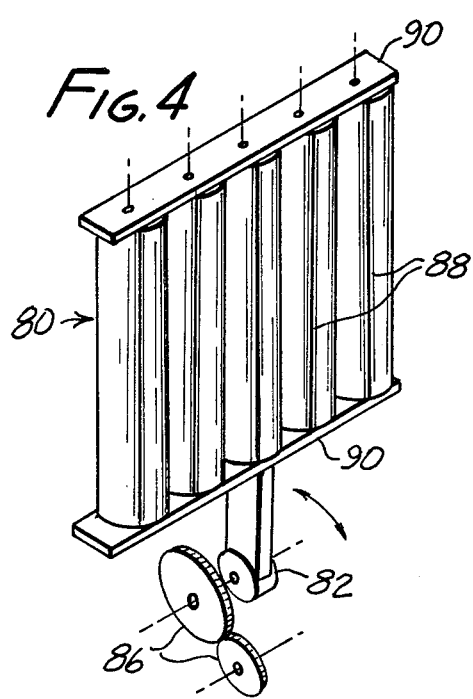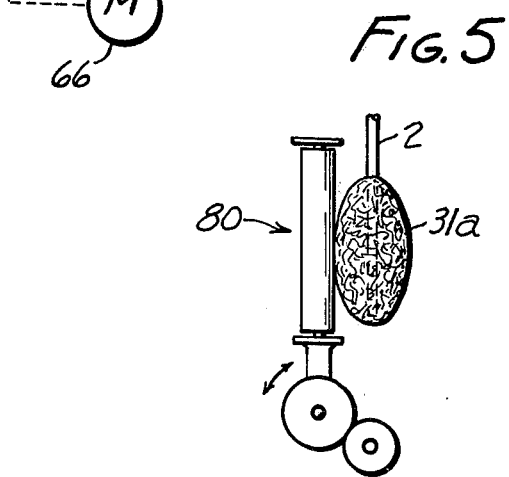

COTTON CANDY MANUFACTURING APPARATUS

TECHNICAL FIELD

This invention has to do with apparatus for the manufacture of cotton candy, and more particularly the invention is concerned with improvements in cotton candy manufacturing apparatus enabling the high speed, high volume manufacture of uniformly sized, uniformly shaped, uniformly weighted, cotton candy cones, ready for packaging and shipping or serving to customers.

BACKGROUND ART

Cotton candy is a staple treat at carnivals, circuses, amusement parks, picnics, parades and sporting events. The cotton candy has traditionally been made by spinning sugar from a distribution head which contained molten sugar. The high speed centrifugal stringing of the sugar resulted in a fluffy mass of "cotton" candy against the walls of the pan which surrounded the head. The cotton candy was collected by precoating with sugar and then twirling within the mass of sugar a paper holder of conical shape commonly. Vendors typically served one customer at a time, and with a flourish in keeping with the festive nature of this candy.

Eventually, the number of persons to be served, and the availability of adequately protective packaging resulted in mass manufacture of cotton candy in central locations and the distribution thereof to various locales and events.

The methods of manufacture, however, did not change with the location of manufacture, except possibly to eliminate the personal flourishing touches. In factories having multiple cotton candy making machines, workers stand at their machines by the hour and individually craft each cone of cotton candy. In addition to the high labor cost inherent in this procedure, it is difficult to set and maintain portion control, and thus cost control, since each operator is different and over the course of a shift, the operator can vary in how much or how little candy is wrapped on each holder. Additionally, the shape can vary. Thus the disadvantages of one-to one production of cotton candy remain, and the psychological benefits to the customer are lost as well.

DESCRIPTION OF THE INVENTION

It is therefore an object of the invention to provide apparatus for the production of cotton candy free of the problems associated with known apparatus and methods of manufacture. It is another object to provide apparatus enabling the factory based production of cotton candy, at low cost, with fewer and less skilled workers, and with increased uniformity of product weight, size, and shape. It is another object to provide improvements in known cotton candy machines which enable the automated formation, separation and recovery of cotton candy cones, without need of human control of the formation and separation steps. It is a highly specific object to provide apparatus in which individual spindles wind cotton candy into the conventional shape with the cooperation of the surrounding pan, and separate the wound portion from the remainder of the mass for delivery outside the pan, all without human intervention.

These and other objects of the invention to become apparent hereinafter, are realized in accordance therewith in apparatus for the manufacture of cotton candy, comprising means adapted to form in situ in a dish shaped pan a generally annular mass of cotton candy circumscribed by the pan, by the provision of spindle means winding a portion of the cotton candy mass on itself for separation from the balance of the mass, and spindle carrying means alternately injecting the spindle into and withdrawing the spindle from the mass of cotton candy in timed relation with the accumulation of cotton candy within the pan to recover successive separated portions of the cotton candy as made in the pan.

In particular embodiments, the apparatus includes means rotating the pan about the pan vertical axis; the spindle carrying means includes an arm movable relative to the pan in spindle injecting or withdrawing relation; the spindle carrying means further includes a shaft coupled to the arm, shaft drive means adapted to angularly drive the arm toward and away from the pan, and means to raise and lower the arm in timed relation with its angular movement relative to the pan for injection of the arm carried spindle into and withdrawal from the cotton candy mass in the pan; and means beyond the pan adapted to compact separated portions of cotton candy in spindle carried relation.

In a preferred embodiment, the apparatus further includes a plurality of spindles circularly distributed about a common axis, and means to index the spindles into and out of the pan in succession for recovery of successive separated portions of the cotton candy mass; the cotton candy forming means comprising an annular, heated, rotating distribution head having peripheral ports adapted to spin molten sugar into cotton candy, and a sugar supply to the head.

In a highly particularly preferred embodiment, there is provided apparatus for the manufacture of cotton candy adapted for use with means forming in situ in a dish shaped pan a generally annular mass of cotton candy circumscribed by the pan, comprising spindle means winding a portion of the cotton candy mass on itself for separation from the balance of the mass, and spindle carrying means alternately injecting the spindle into and withdrawing the spindle from the mass of cotton candy in timed relation with the accumulation of cotton candy within the pan to recover successive separated portions the cotton candy as made in the pan.

In such embodiments, typically: the spindle means comprises a spindle rotatable on the pan axis, and the spindle carrying means comprises an angularly movable arm and means to rotatably drive the spindle; there is provided a plurality of the spindles and carrying means for each the spindle, the spindles being circularly spaced about a common axis, and there is included also means to index the spindles angularly about the axis, e.g. such means to index the spindles comprises a shaft coupled to the arms and defining the spindle common axis, and there is provided means to rotate the shaft including first gear means on the shaft, shaft first gear drive means, and means selectively engaging the shaft first gear and the first gear drive means to effect angular indexing of the arms and the spindles carried thereby; and further there is provided second gear means on the shaft, and shaft second gear drive means, wherein the selective engagement means further selectively engages the shaft second gear and the second gear drive means to effect rotation of the spindles about their own respective axes; the first and second shaft gear means define a pair of gears in axially spaced relation along the shaft, the selective engagement means comprising an axially spaced pair of drive gears, the shaft being axially bodily displaceable a predetermined distance between positions to alternately engage one member of each pair of gears, respectively to alternately angularly index and rotate the spindles on their own axes; the dish-shaped pan has a central axis, and a molten sugar distribution head rotatable about the central axis and adapted to form an annular mass of cotton candy circumscribed by the pan, and means differentially rotating the pan and head about the pan central axis in cotton candy mass forming relation; the predetermined axial displacement distance of the shaft provides spindle travel parallel to the central axis of the pan sufficient for each the spindle to be successively injected into and withdrawn from the cotton candy mass; further provided is means bodily displacing the shaft in a direction parallel to the pan central axis over the predetermined distance; the arms rotate with the shaft and are bodily displaceable therewith between raised and lowered positions in spindle travel defining relation; the first shaft gear is engaged with the first drive gear in response to the arms being in their raised position, the spindles being withdrawn from the cotton candy mass with the arms in the raised position, for indexing the arms and the spindles carried thereby beyond and freely of interference from the pan; the second shaft gear is engaged with the second drive gear in response to the arms being in their lowered position, the spindles being injected into the cotton candy mass with the arms in their lowered position, for rotating the spindles about their respective axes, in cotton candy accumulation winding and recovering relation; the first drive gear and the shaft first gear are relatively positioned so as to engage selectively responsive to upward displacement of the shaft, and means are provided disabling the first drive gear in degree of indexing movement determining relation; the shaft displacing means comprises a worm and follower assembly acting on the shaft; the pan defines a first station, and also provided are second and third stations beyond the pan, the spindles being indexable between the stations in succession, whereby the spindles wind cotton candy around themselves at the first station for removal to the second station, the second station comprises means compacting the removed cotton candy in spindle carried relation for carriage to the third station, and the compacted cotton candy is separated from the spindles at the third station and the spindle returned to the first station while the cotton candy is recovered; the second station compacting means comprises a baffle adapted to bear on the periphery of the removed cotton candy in compacting relation; and the baffle comprises means having rolling contact with the cotton candy periphery in compacting relation.

THE DRAWINGS

The invention will be further described as to an illustrative embodiment in conjunction with the attached drawings in which:

FIG. 2 is a view like FIG. 1, showing the apparatus in position for indexing between stations;

FIG. 4 is a fragmentary view of the compacting baffle according to the invention; and FIG. 5 is a side elevation view of the compacting baffle of FIG. 4 in use.

PREFERRED MODES

Figure 1:
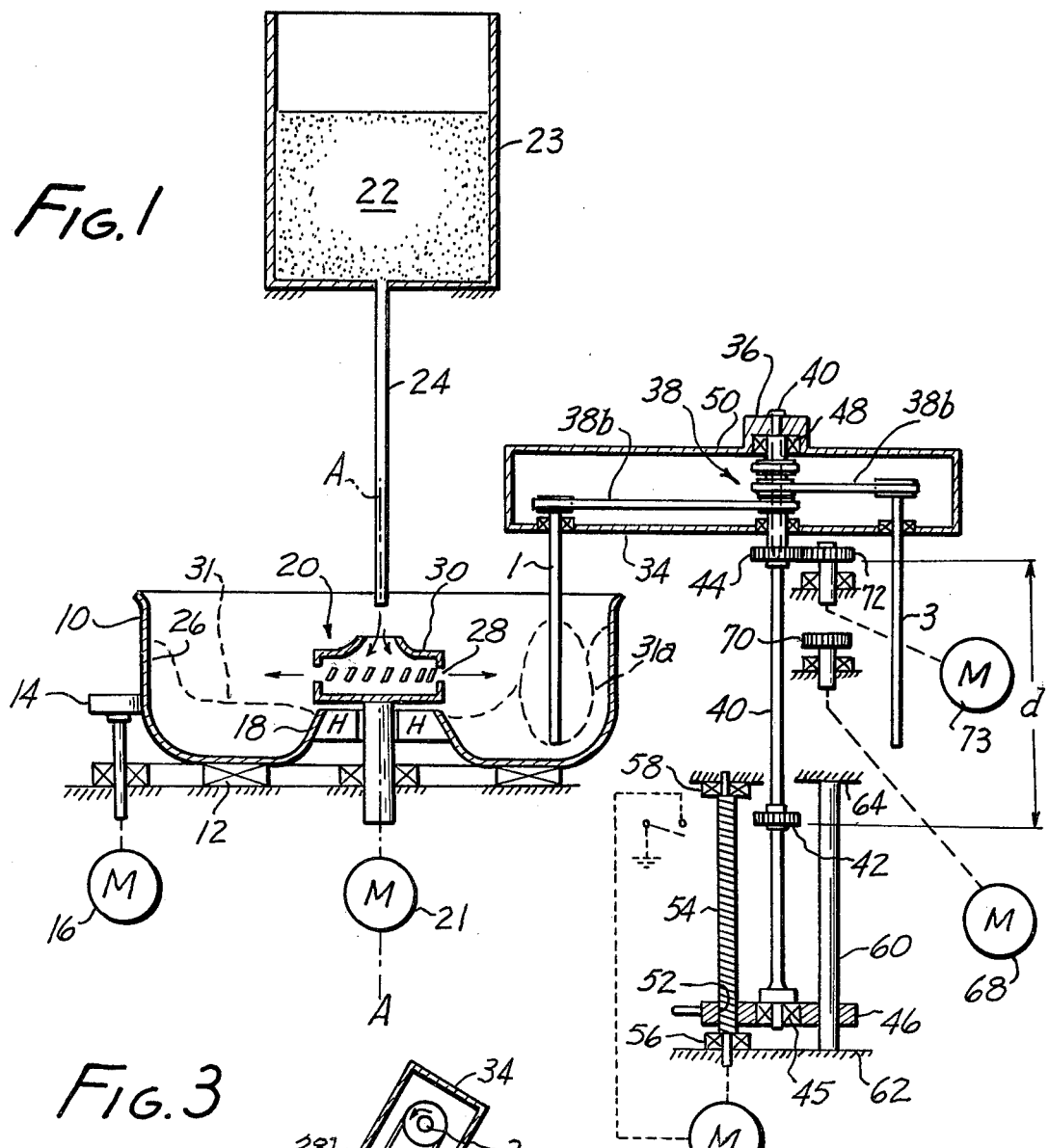
FIG. 1 is a generally schmatic view, partly in section, of the apparatus according to the invention, in position to wind cotton candy cones from a cotton candy mass.

Turning now the drawings in detail, in FIG. 1 a conventional dish-shaped pan 10 is carried for rotation on annular bearing 12, driven peripherally by wheel 14 which in turn is driven by motor 16. The pan 10 is rotated at a predetermined speed as will be explained hereinafter. Pan 10 has a central axis A—A, an annular boss 18 centered thereon in which heater H is disposed. A distribution head 20 rotated at high speed by motor 21, differentially of pan 10 and independent thereof, on bearings not shown, receives granular sugar 22 from supply tank 23 through tubing 24. Operation of the distribution head 20 once sugar is received is conventional: the sugar is melted and spun out at high speed toward the wall 26 of the pan from a plurality of ports 28 in the head cylinder 30.

Figure 3:
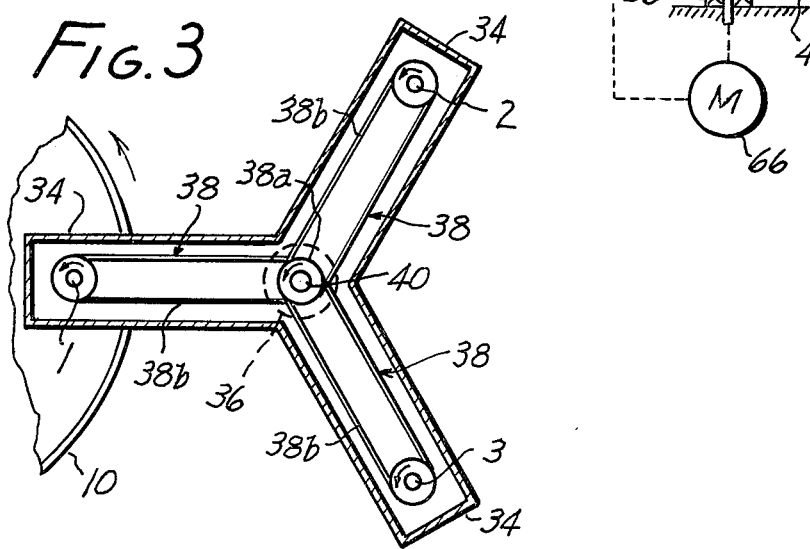
FIG. 3 is a detail plan view of the spindle carrying arms of the apparatus, a portion of the arm being shown in section.

The invention provides means for recovery of the cotton candy mass 31 which accumulates as a result of the operation of head 20. With reference to FIGS. 1 and 3, particularly, a series of spindles 1, 2, and 3, are carried in downwardly depending relation by arms 34. As carried, the spindles 1-3 are parallel with the axis A—A of the pan 10. Arms 34 extend radially in a horizontal plane from common hub 36, being arranged at about 120° from each other. Greater or lesser numbers of arms 34, and greater or lesser angular spacing therebetween can be employed. The lateral extension of arms 34 is that sufficient to overlie the pan 10 at one point and to be beyond the pan at another point, as shown. Each spindle 1-3 is driven counterclockwise by chain and sprocket assemblies 38, the arms 34 defining a shroud of sheet metal around the assemblies, also as shown.

It is a signal feature of the invention, that spindles are used to collect the accumulated cotton candy, and then the spindle and its load of cotton candy is removed from the remainder of the mass 31. To accomplish this in a preferred embodiment, means is provided to alternately raise and lower the spindles 1-3 into and from the interior volume of the pan 10, and to index the spindles among compacting and unloading stations in succession or sequence, before returning the spindle to the first or loading station.

The raising and lowering/indexing means comprises in the presently preferred form a shaft 40 extending vertically and essentially parallel to the pan axis A—A, having first gear means thereon in the form of spur gear 42, having second gear means thereon in the form of spur gear 44, the first and second gears being axially spaced a predetermined distance d, along the length of the shaft for purposes to appear.

Shaft 40 is rotatably journaled in lower bearing 45 supported by a foot plate 46 at its lower end, and is rotatably journaled in upper bearing 48 carried by upper wall 50 of arm 34, at its upper end. Foot plate 46 has a tapped aperture 52 offset from the bearing 45. Worm 54 journaled in bearings 56 and 58 extends parallel to the shaft 40, and is threadedly engaged with the foot plate 46. A guide shaft 60 also parallel to the shaft 40, supported by plates 62 and 64, and offset from shaft 40, guides the foot plate 46 as the plate is lifted by the action of the worm 54, to maintain the plate horizontal, the plate acting as a worm follower and lifting the shaft 40 bodily upward responsive to rotation of the worm by the motor 66.

The shaft 40 has an upward and a downward position, determined by the location of the foot plate 46. The up position, shown in FIG. 2 is used to index the arm 34 and its depending spindles, so that spindle 1 can be moved from the locus of the pan 10, and spindle 2 replace it. In this manner, a cotton candy laden spindle can be moved from the pan 10 to a compacting station, to be described in connection with FIGS. 4 and 5, and thence on another indexing, to an unloading station. Indexing is effected by engagement of shaft gear 42 with drive gear 70, driven by motor 68. As long as the drive gear 70 is engaged with the shaft gear 42 and the motor 68 is operating, the shaft will turn, carrying the arms 34 angularly, and the spindles as well. Naturally this is accomplished with the arms 34 raised up to avoid interference with the pan wall 26. Since only a slight, e.g. 120° movement is desired, the drive gear 70 is disengaged from shaft gear 42, by the motor 66 reversing, causing the worm 54 to lower the foot plate 46 and move the shaft gear 42 below the drive gear 70. Other indexing expedients, e.g. timing cycles can also be used.

Once properly indexed, the spindles 1, 2, and 3 are lowered by the action of the foot plate 46, and the cotton candy winding operation recommences. The spindles 1, 2 and 3 are rotated about their own axes by virtue of engagement of shaft gear 44 with drive gear 72 driven by motor 73, see FIG. 1. As will be seen by comparing FIGS. 1 and 2, the lifting of the shaft 40 by the foot plate 46 disengages the shaft gear 44 from the drive gear 72. After loading of the cotton candy on the spindle within the pan 10, the cycle is repeated, initially by having the worm 54 lift the shaft 40 upward.

In overall summary, operation of the apparatus is as follows. The pan 10 is rotated by motor 16, the heater H is heated; sugar 22 is fed down from tank 23 into head 20, where it is melted and expelled under great centrifugal force against the side wall 26 of the pan 10. Cotton candy accumulates as a mass 31. Referring to FIG. 1, spindle 1 is injected into the mass 31 by lowering the arm 34, and its dependent spindle into the pan 10 below. The position from which the spindle 1 is lowered is shown in FIG. 2. Returning to FIG. 1, worm motor 66 is inactived. Drive gear 72, however, rotated by motor 73 drives shaft gear 44, resulting in rotation of shaft 40. Shaft gear 42 is not engaged at this time. The rotation of shaft 40 rotates sprockets 38a, causing chains 38b to operate, turning the several spindles 1, 2 and 3.

Rotation of spindle 1, immersed in the cotton candy mass 31, in conjunction with the rotation, also counter-clockwise, as shown in FIG. 2, results in a winding of a portion of the mass surrounding the spindle around the spindle. The quantity of the wound portion, its tightness, and shape are controllable through adjustment of the relative spacing of the spindle 1 from the pan wall 26, the relative speeds of rotation, which affects shear forces on the portion, and of course, the duration of the spindle remaining in the mass, or dwell time.

After sufficient cotton candy accumulation, the motor 66 is used to raise the shaft 40 to the position depicted in FIG. 2. The arms 34 are now well above the pan 10, the spindles 1, 2 and 3 are clear of the pan as well. The drive gear 70 and shaft gear 42 are now engaged.

The engagement of the shaft gear 42 with the driven gear 70, gives a rotational impetus to the shaft 40, and this results in the shaft rotating a part of a full turn, commensurate with the extent of continuing engagement of the gears, e.g. 120°, whereby the arms 34 and their depending spindles 1, 2 and 3 are indexed the 120°, or more or less as required. Because the arms 34 are elevated on the shaft 40, there is no interference of the spindles 1, 2 or 3 on the pan 10, during indexing.

The spindle 1, carrying the wound cotton candy portion, is carried by the indexing movement to the second station shown in FIGS. 4 and 5 where the cone 31a of cotton candy is compacted. This is accomplished by baffle 80, pivotally mounted at 82, and driven by means not shown through gears 86, moving progressively into the cone of cotton candy, as shown. The cotton candy is still being rotated by virtue of being carried by the spindle 2, and thus the force of the baffle 80 is applied tangentially and serves to compact the candy. Baffle 80 is preferably a series of vertically disposed rollers 88 held for individual rotation by a surrounding frame 90, to minimize friction and loss of material at the compacting station, but other configurations may be employed such as a flat paddle.

The cotton candy portion, after compacting, is carried by the indexing movement to a third station where the cone is removed, e.g. by an operator or automatic equipment, after being bagged, and placed in a carton for shipment.

The sequence of operations is then repeated for as many cotton candy cones as required.

The several motors described can obviously combined for serial or joint operation; the cones can be wound on conventional cardboard sticks carried by the spindles, or free of such sticks, as desired.

There is thus provided in accordance with the invention an improvement in cotton candy manufacturing by which labor cost, personal contamination, and disuniformities in production of cotton candy on a large scale are reduced and minimized.

I claim:

1. Apparatus for making cotton candy, comprising: a dish-shaped pan having an open end, means adapted to form in situ in said dish-shaped pan a generally annular mass of cotton candy circumscribed by said pan, spindle means for winding a portion of said cotton candy mass on itself and about said spindle for separation of said portion from a remainder of said mass, spindle carrying means for injecting said spindle into said open end of said pan and into said mass of cotton candy and withdrawing said spindle from said mass of cotton candy and said open end, and timing means for controlling said carrying means and said injecting and said withdrawing in timed relation with accumulation of cotton candy within said pan so as to recover successive separated portions of said cotton candy as it is made in said pan.

2. Apparatus according to claim 1, including also means rotating said pan about the pan vertical axis.

3. Apparatus according to claim 1, including also means beyond said pan adapted to compact separated portions of cotton candy in spindle carried relation.

4. Apparatus according to claim 1, including also a plurality of spindles circularly distributed about a common axis, and means to index said spindles into and out of said pan in succession for recovery of successive separated portions of said cotton candy mass.

5. Apparatus according to claim 1, in which said cotton candy forming means comprises an annular, heated, rotating distribution head having peripheral ports adapted to spin molten sugar into cotton candy, and a sugar supply to said head.

6. Apparatus according to claim 1, in which said spindle carrying means includes an arm movable relative to said pan in spindle injecting or withdrawing relation.

7. Apparatus according to claim 6, in which said spindle carrying means further includes a shaft coupled to said arm, shaft drive means adapted to angularly drive said arm toward and away from said pan, and means to raise and lower said arm in timed relation with its angular movement relative to said pan for injection of the arm carried spindle into and withdrawl from the cotton candy mass in the pan.

8. Apparatus for making cotton candy comprising: a dish-shaped pan having an open end and means cooperating with said pan for forming cotton candy in said pan in a generally annular mass circumscribed by said pan, spindle means for winding a portion of said cotton candy on itself for separation from a remainder of said mass, spindle carrying means for alternately injecting said spindle into said open end of said pan and withdrawing said spindle from said open end and from said mass of cotton candy, and timing means for controlling operation of said spindle carrying means in said injecting and said withdrawing in timed relation to the accumulation of cotton candy within said pan to recover successive separated portions of said cotton candy as said candy is formed in said pan.

9. Apparatus according to claim 8, in which said spindle means comprises a spindle rotatable on its own axis, said spindle carrying means comprising an angularly movable arm, and means to rotatably drive said spindle.

10. Apparatus according to claim 9, including also a plurality of said spindles and carrying means for each said spindle, said spindles being circularly spaced about a common axis, and including also means to index said spindles angularly about said axis.

11. Apparatus according to claim 10, in which said means to index said spindles comprises a shaft coupled to said arms and defining said spindle common axis, and means to rotate said shaft including first gear means on said shaft, shaft first gear drive means, and means selectively engaging said shaft first gear and said first gear drive means to effect angular indexing of said arms and the spindles carried thereby.

12. Apparatus according to claim 11, including also second gear means on said shaft, and shaft second gear drive means, and in which said selective engagement means further selectively engages said shaft second gear and said second gear drive means to effect rotation of said spindles about their own respective axes.

13. Apparatus according to claim 12, in which said first and second shaft gear means define a pair of gears in axially spaced relation along said shaft, said selective engagement means comprising an axially spaced pair of drive gears, said shaft being axially bodily displaceable a predetermined distance between positions to alternately engage one member of each pair of gears, respectively to alternately angularly index and rotate said spindles on their own axes.

14. Apparatus according to claim 13 in which said pan has a central axis and including also a molten sugar distribution head rotatable about said central axis and adapted to form an annular mass of cotton candy circumscribed by the pan, and means differentially rotating the pan and head about said pan central axis in cotton candy mass forming relation.

15. Apparatus according to claim 14, in which said pan defines a first station, and including also second and third stations beyond said pan, said spindles being indexable between said stations in succession, whereby said spindles wind cotton candy around themselves at said first station for removal to said second station, said second station comprises means compacting the removed cotton candy in spindle carried relation for carriage to said third station, and said compacted cotton candy is separated from said spindles at said third station and the spindle returned to said first station while the cotton candy is recovered.

16. Apparatus according to claim 15, in which said second station compacting means comprises a baffle adapted to bear on the periphery of the removed cotton candy in compacting relation.

17. Apparatus according to claim 16, in which said baffle comprises means having rolling contact with said cotton candy periphery.

18. Apparatus according to claim 14, in which said predetermined axial displacement distance of said shaft provides spindle travel parallel to the central axis of said pan sufficient for each said spindle to be successively injected into and withdrawn from said cotton candy mass.

19. Apparatus according to claim 18, including also means bodily displacing said shaft in a direction parallel to said pan central axis over said predetermined distance.

20. Apparatus according to claim 19, in which said arms rotate with said shaft and are bodily displaceable therewith between raised and lowered positions in spindle travel defining relation.

21. Apparatus according to claim 20, in which said first shaft gear is engaged with said first drive gear in response to said arms being in their raised position, said spindles being withdrawn from said cotton candy mass with the arms in said raised position, for indexing said arms and the spindles carried thereby beyond and freely of interference from said pan.

22. Apparatus according to claim 21, in which said second shaft gear is engaged with said second drive gear in response to said arms being in their lowered position, said spindles being injected into said cotton candy mass with the arms in their lowered position, for rotating said spindles about their respective axes, in cotton candy accumulation winding and recovering relation.

23. Apparatus according to claim 22, in which said first drive gear and said shaft first gear are relatively positioned so as to engage selectively responsive to upward displacement of the shaft, and means disengaging said first drive gear and said first shaft gear in degree of indexing movement being determining relation.

24. Apparatus according to claim 23, in which said shaft displacing means comprises a worm and follower assembly acting on said shaft.

* * * * *